United States Patent
Rudelic

(10) Patent No.: US 9,158,709 B2
(45) Date of Patent: *Oct. 13, 2015

(54) POWER CYCLING EVENT COUNTERS FOR INVOKING SECURITY ACTION

(71) Applicant: MICRON TECHNOLOGY, INC., Boise, ID (US)

(72) Inventor: John Rudelic, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/059,208

(22) Filed: Oct. 21, 2013

(65) Prior Publication Data

US 2014/0136806 A1    May 15, 2014

Related U.S. Application Data

(63) Continuation of application No. 12/625,716, filed on Nov. 25, 2009, now Pat. No. 8,566,940.

(51) Int. Cl.
| | |
|---|---|
| *G06F 21/81* | (2013.01) |
| *G06F 12/14* | (2006.01) |
| *G06F 21/79* | (2013.01) |
| *G06F 21/55* | (2013.01) |

(52) U.S. Cl.
CPC .......... *G06F 12/1425* (2013.01); *G06F 21/552* (2013.01); *G06F 21/79* (2013.01); *G06F 2221/2135* (2013.01)

(58) Field of Classification Search
CPC .............................. G06F 21/81; G06F 12/1425
USPC .................. 726/22–36; 713/193, 194, 1, 100; 711/100, 103, 163, 167
See application file for complete search history.

(56) References Cited

U.S. PATENT DOCUMENTS

| | | | |
|---|---|---|---|
| 5,487,096 A | 1/1996 | Pearson et al. | |
| 5,533,123 A | 7/1996 | Force et al. | |
| 7,356,442 B1 * | 4/2008 | Astigarraga et al. | 702/182 |
| 2004/0128528 A1 * | 7/2004 | Poisner | 713/200 |
| 2005/0108491 A1 * | 5/2005 | Wong et al. | 711/167 |
| 2006/0174326 A1 * | 8/2006 | Ginter et al. | 726/3 |
| 2006/0236409 A1 * | 10/2006 | Kuehnel et al. | 726/36 |
| 2007/0022243 A1 | 1/2007 | Rudelic | |
| 2007/0055829 A1 | 3/2007 | Rudelic | |
| 2007/0074048 A1 * | 3/2007 | Rudelic et al. | 713/193 |
| 2008/0266089 A1 * | 10/2008 | Haren et al. | 340/568.1 |
| 2008/0282088 A1 | 11/2008 | Rudelic | |
| 2008/0307086 A1 * | 12/2008 | Brooks et al. | 709/223 |
| 2009/0249014 A1 * | 10/2009 | Obereiner et al. | 711/164 |
| 2010/0017881 A1 * | 1/2010 | Goyet | 726/24 |
| 2010/0132048 A1 * | 5/2010 | Hall et al. | 726/27 |
| 2011/0113182 A1 * | 5/2011 | Reyes | 711/102 |

OTHER PUBLICATIONS

Chip Card & Security ICs my-d vicinity, SRF 55V10S, Infineon Technologies AG, 2007.

(Continued)

*Primary Examiner* — Shanto M Abedin
(74) *Attorney, Agent, or Firm* — Knobbe Martens Olson & Bear LLP

(57) ABSTRACT

Subject matter disclosed herein relates to memory devices and security of same.

15 Claims, 5 Drawing Sheets

(56) References Cited

OTHER PUBLICATIONS

Numonyx Memory Solutions, "Numonyx® M58LT (1.8V Secure Flash Memory)" <http://www.numonyx.com/en-US/MemoryProducts/NOR/Pages/M58LT.aspx>, 2 pages, retrieved Nov. 24, 2009.

USPTO; Office Action dated Dec. 23, 2011, from related application U.S. Appl. No. 12/625,716, filed Nov. 25, 2009.

USPTO; Office Action dated May 30, 2012, from related application U.S. Appl. No. 12/625,716, filed Nov. 25, 2009.

* cited by examiner

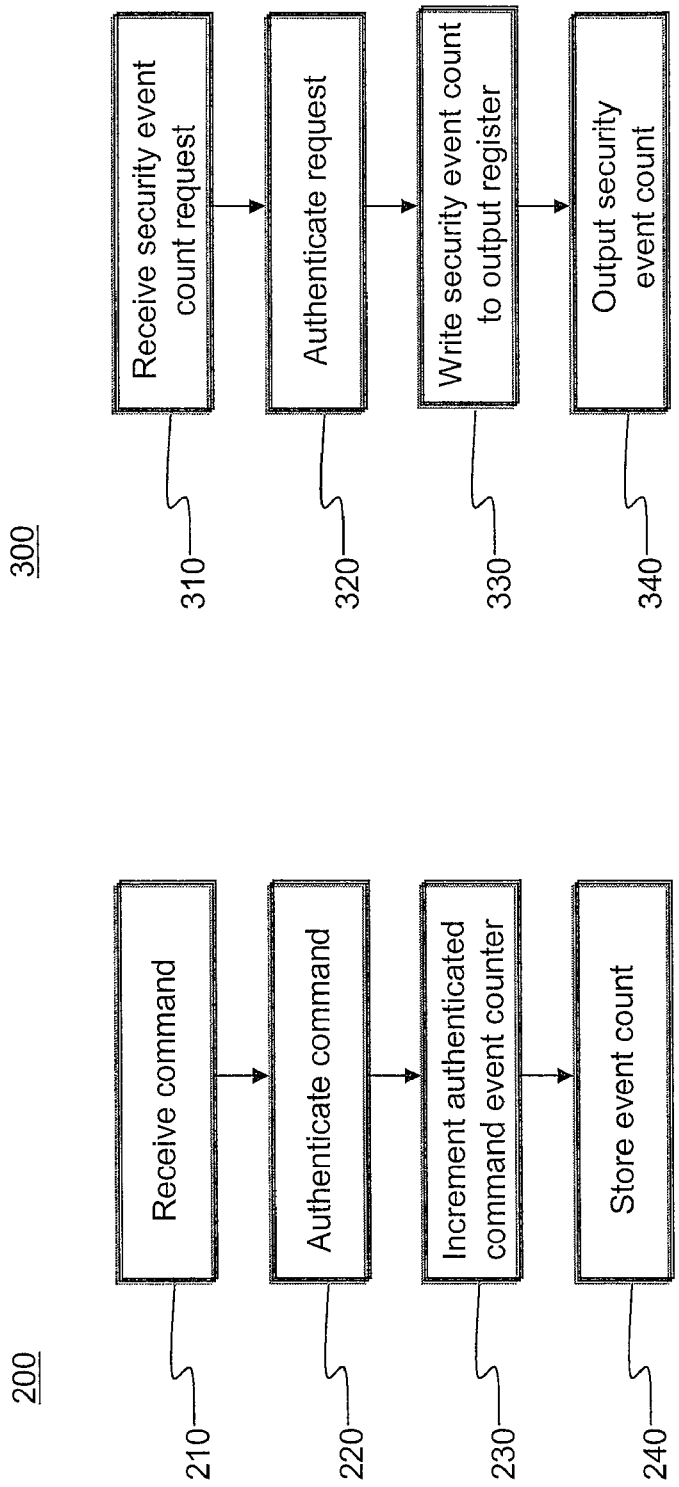

POWER CYCLING EVENT COUNTERS FOR INVOKING SECURITY ACTION

CROSS-REFERENCE TO RELATED APPLICATION

This application is a continuation application of U.S. application Ser. No. 12/625,716, filed Nov. 25, 2009, now U.S. Pat. No. 8,566,940, issued Oct. 22, 2013, the entirety of which is incorporated by reference herein.

BACKGROUND

1. Field

Subject matter disclosed herein relates to memory devices and security of same.

2. Information

Increasingly, memory devices may be implemented to store sensitive information, such as financial, medical, and/or personnel records, for example. Additionally, such memory devices may store information used to operate computing systems, such as executable code, system operating parameters, and so on. Unfortunately, such important and/or sensitive information may be targeted by increasingly sophisticated security attacks. For example, such an attack may involve unauthorized modifying, reading, and/or downloading of databases of financial records, contributing to identity theft.

Security technology may include techniques to authenticate operations of a memory device in order to prevent memory contents from being modified and/or read without passing a signature validation process, for example.

BRIEF DESCRIPTION OF THE FIGURES

Non-limiting and non-exhaustive embodiments will be described with reference to the following figures, wherein like reference numerals refer to like parts throughout the various figures unless otherwise specified.

FIG. 2 is a flow diagram of a process for counting a security event, according to an embodiment.

FIG. 3 is a flow diagram of a process for reading an event counter, according to an embodiment.

DETAILED DESCRIPTION

Figure 1:
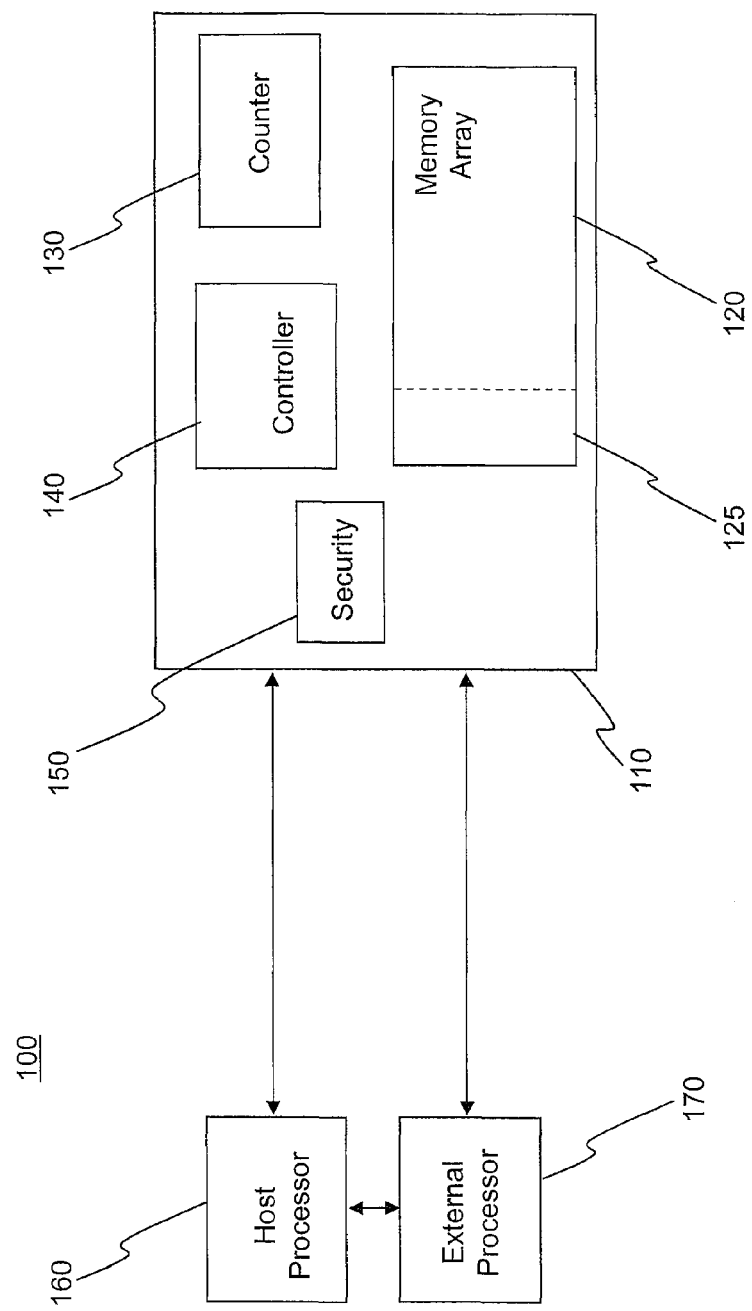
FIG. 1 is a schematic diagram of a processor-memory system, according to an embodiment.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Embodiments described herein include techniques to determine if a memory device, or a computing system that incorporates a memory device, is or has been subjected to a security attack. Such techniques may include one or more defensive processes. One such process may involve limiting the number and/or type of memory device operations that may occur in order to defend against a potential pending security attack. For example, reading contents stored in a memory device may be forbidden for a particular span of time, until a threat of such a security attack has ended. Such techniques may involve a memory device that supports authenticated operations, wherein a process of passing a signature validation are performed before contents of the memory device may be modified. Such a memory device itself may maintain counters to count security events associated with an attempt to access the memory device, for example. As explained in further detail below, maintaining such counters may allow the memory device to determine whether the memory device is, or has been, the target of a security attack.

In an embodiment, a method of detecting a security attack on a memory device and/or associated computing system may include counting security events within a memory device and storing a count of such security events within the memory device. Security event counts may be used by software internal to the memory device and/or security software running on a host computing platform in order to monitor and/or detect attacks. For example, if a computing system is under attack, there may be a spike in a particular security event count providing an indication of a likelihood of an attack.

Comparing a stored count of a particular security event with an expected value may lead to detection of a security attack. Here, a security event may include an event associated with an attempt to access a memory device and/or associated computer system, wherein detecting a security attack may be based, at least in part, on a number of occurrences of such a security event. Various ways to attempt to access a memory device may involve a read command, a write command, adding keys, deleting keys, and/or modifying keys, just to name a few examples. Here, security events may be defined as being associated with such attempts to access a memory device. For example, in an implementation, a security event may comprise a failed authenticated read command to access a memory device. A higher-than-expected number of such failed authenticated read command events may imply a relatively high probability that a memory device was or is subjected to a security attack. Other security events may comprise an authenticated read command, an authenticated secure write command, a failed authenticated secure write command, an authenticated patch, a failed authenticated patch, adding keys, modifying keys, deleting keys, and/or power cycling, just to name a few examples. In one implementation, security operations performed by a memory device may be counted by a security event counter that counts such operations whether the operations are successful or unsuccessful (e.g., a separate count for each such condition).

As mentioned above, one or more counts corresponding to security events may be stored within a memory device in order to provide at least an additional degree of security protection to such stored counts, compared to storing counts at a memory location external to the memory device. For example, in a particular implementation, stored counts may be prevented from being accessed without an authenticated read command. This may prevent stored counts from being modified by an unauthorized, and potentially illicit, entity.

For example, such an implementation may prevent an unauthorized user from erasing and/or modifying counts corresponding to security events.

In another embodiment, reaching a particular number of security events may lead to initiating defensive measures to protect a memory device and/or associated computing system from a security attack. For example, a security attack may lead to an unusually high number of security events, such as power cycling of a device hosting the computing system and/or memory device. Accordingly, counting such a relatively high number of security events may lead to an indication that a security attack is underway. Upon such an indication, a memory device and/or associated computing system may perform any one of a number of techniques to defend against such a security attack. For example, a computing system may automatically power down without any user interaction, and/or output an alarm or message to a user to indicate a potential presence of a security attack. In one implementation, detecting a security attack may be based, at least in part, on reaching a particular threshold number of security events within a particular period of time. For example, a host device may (normally) expect to experience less than one hundred power cycles per month. Thus, if one hundred power cycles are applied to a host device in one hour, then a security attack may be suspected. In a particular implementation, such a threshold number, if not exceeded within a particular period of time, may be increased to allow for normal (e.g., attack-free) operating conditions. For example, in a first month, a particular threshold may be set to one hundred power cycles. In the second month, such a threshold may be increased to two hundred power cycles, and so on. Of course, such details of protecting a memory device and/or associated computing system from a security attack are merely examples, and claimed subject matter is not so limited.

FIG. 1 is a schematic view of a computing system 100, according to an embodiment. Such a computing system 100 may be included in a host device (not shown) such as personal digital assistant (PDA), mobile phone, computing device, and/or other electronic device, for example. A host processor 160, internal to computing system 100, may be communicatively connected to a memory device 110. For example, host processor 160 may transmit data, read/write commands, and/or security information to memory device 110, as well as receive read data and/or security information from memory device 110. Such security information may comprise security keys, for example. In one implementation an external processor 170, external to computing system 100, may be communicatively connected to memory device 110. Such communication may be performed wirelessly, for example. External processor 170 may comprise a server to manage one or more memory devices 110. Host processor 160 and external processor 170 may communicate with memory device 110 independently of one another and/or at different times, though claimed subject matter is not so limited. In another implementation, external processor 170 may be communicatively connected to host processor 160.

Memory device 110 may comprise a memory array 120, counter 130, controller 140, and/or security portion 150. In one implementation, memory array 120 may comprise an array of addressable memory cells to which data may be written and/or from which data may be read. Memory array 120 may be partitioned into two or more portions such as sub portion 125, which may be reserved for maintaining counter information provided by counter 130, for example. In one implementation, sub portion 125 may store information that may be accessed upon receiving an authenticated signature with a read command. Such authentication may be performed internal to the memory device 110, for example. Memory array 120 may comprise flash memory, phase change memory (PCM), and/or other nonvolatile memory, just to name a few examples.

Counter 130 may comprise logic circuit components and/or executable code to count one or more events such as security events discussed above. In an implementation, counter 130 may include multiple individual counters to count different security events. For example, one counter may count power cycles applied to a host device, another counter may count authenticated write operations, yet another counter may count failed read operations, and so on. Such multiple individual counters may provide respective count numbers to memory array 120 so that count numbers for security events may be stored for subsequent reading by host processor 160 or for subsequent use by software internal to memory device 110, as explained below.

Security portion 150, which may be implemented by software maintained on memory array 120, may authenticate and/or validate commands received from host processor 160 and/or external processor 170. Such authentication may involve techniques using security keys, for example. In one implementation, controller 140 may receive read/write commands from host processor 160 and/or external processor 170, and subsequently implement security portion 150 in order to authenticate and/or validate such commands. Upon such authentication, memory controller 140 may direct data flow to/from memory array 120 using appropriate memory addressing, for example. In one implementation, controller 140 may retrieve count numbers from individual security event counters included in counter 130 and write such count numbers in memory array 120. In particular, as explained above, count numbers may be stored in sub portion 125, which may comprise a portion of memory array 120 reserved for storing security event count numbers. Of course, such details of computing system 100 are merely examples, and claimed subject matter is not so limited.

FIG. 2 is a flow diagram of a process 200 for counting security events, according to an embodiment. As explained above, a security event may comprise any one of many types of events. Process 200 is an illustrative example that merely involves one such event, namely, an authenticated command. Process 200 may involve other security events, and claimed subject matter is not limited to any particular security event. At block 210, a memory device, such as memory device 110 shown in FIG. 1, for example, may receive a command from a host processor. Such a command may comprise a read and/or a write command. In one implementation, a security portion 140 may apply an authentication process to a received command. For example, a received command may include a signature key associated with a particular host processor. In one implementation, such a signature key may comprise a hash function, though claimed subject matter is not so limited. Security portion 140 may determine whether such a signature key corresponds to any of those associated with one or more host processors that are permitted access to memory device 110. If such a correspondence is determined, then at block 220 the received command may be authenticated. A counter internal to memory device 110 may count the number of such received commands that are authenticated. Another counter may count the number of received commands that are not authenticated and subsequently denied access to memory device 110. Such counters, as described above, may be included in counter 130 shown in FIG. 1, for example. At block 230, the counter that counts authenticated commands may be incremented in response to authentication of the received command. At block 240, a resulting count number may be stored in memory device 110.

As described in the illustrative example above, a security event may be detected from an action by a host processor, whether such a processor is internal or external to a particular computing system. On the other hand, a security event may be detected from events and/or sources other than issued commands and/or processors. For example, a security event may comprise a power cycle resulting from a battery or other power source becoming physically disconnected from a computing system. Accordingly, security events may result from a variety of sources and/or situations and claimed subject matter is not limited to any particular security event described in examples included herein.

FIG. 3 is a flow diagram of a process 300 for reading an event counter, according to an embodiment. Such a process may be initiated by a host processor included within a computing system that includes memory device 110, such as computing system 100 shown in FIG. 1, for example. Alternatively, process 300 may be initiated by external processor 170 that is external to computing system 100 that includes memory device 110. For example, process 300 may be initiated remotely from a server that manages one or more such computing systems and/or memory devices, though claimed subject matter is not so limited. In one implementation, process 300 may be initiated in response to a security check event, which may include determining security status of a computing system and/or a memory device, for example. Such a security check may be initiated from time to time, on a regularly scheduled basis, or in response to detecting suspicious and/or abnormal activity related to a computing system and/or a memory device. For example, host processor 160 and/or memory device 110 may initiate a security check upon detecting an unusual number of unauthorized read commands during a particular period of time. Such a number of unauthorized read commands may be determined, for example, by examining count numbers stored in memory device 110, as described in further detail below. In another example, host processor 160 and/or memory device 110 may initiate a security check every hour. In such a case, at block 310, memory device 110 may receive a security event count request. At block 320, similar to an authentication process applied to read/write commands, for example, a security event request may be authenticated by memory device 110. If such a request is authenticated, at block 330 memory device 110 may write a requested security event count to an output register (not shown). Subsequently, at block 340, the requested security event count may be provided to the requesting entity, which may comprise host processor 160, for example.

Figures 4, 5:
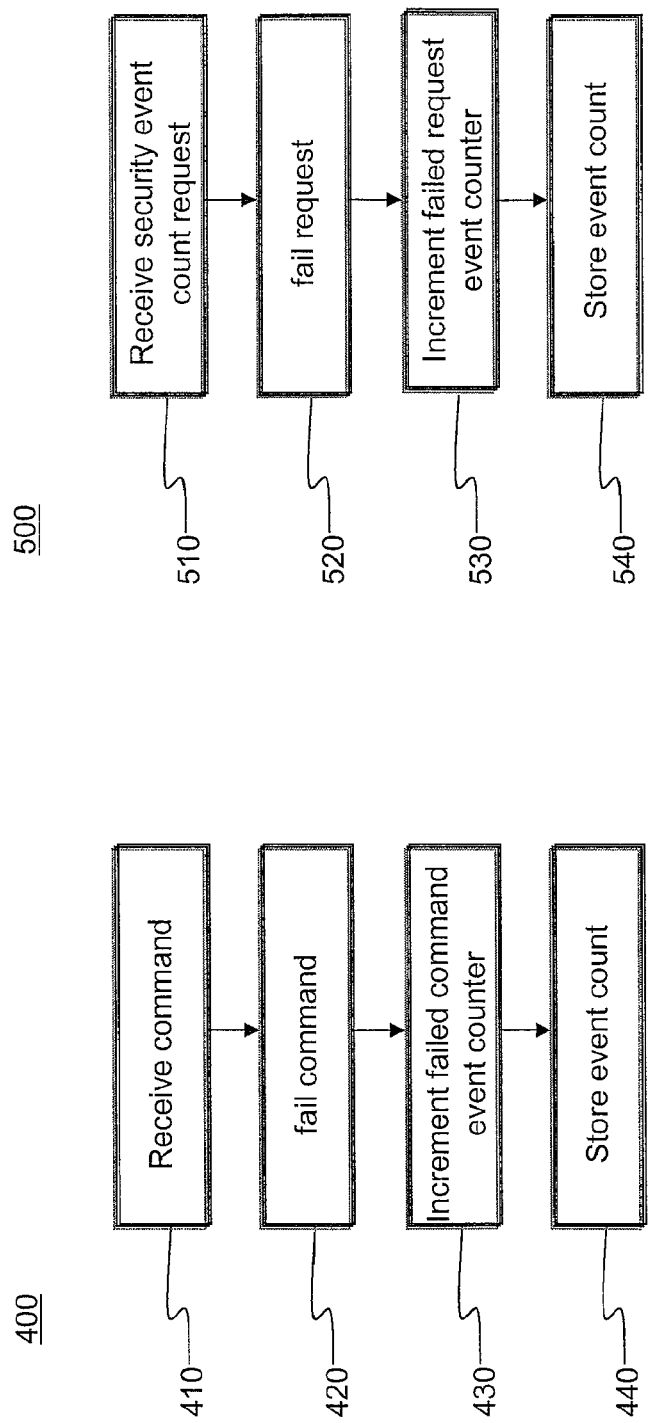
FIG. 4 is a flow diagram of a process for counting a security event, according to another embodiment.
FIG. 5 is a flow diagram of a process for counting a failed count request, according to an embodiment.

FIG. 4 is a flow diagram of a process for counting a security event, according to another embodiment. As explained above, a security event may comprise any one of many types of events. Process 400 is an illustrative example that merely involves one such event, namely, a command that fails an authentication process. Process 400 may involve other security events, and claimed subject matter is not limited to any particular security event. At block 410, a memory device, such as memory device 110 shown in FIG. 1, for example, may receive a command from a host processor. Such a command may comprise a read and/or a write command. In one implementation, a security portion 140 may apply an authentication process to a received command. For example, a received command may include a signature key associated with a particular host processor. In one implementation, such a signature key may comprise a hash function, though claimed subject matter is not so limited. Security portion 140 may determine whether such a signature key corresponds to any of those associated with one or more host processors that are permitted access to memory device 110. If such a correspondence is determined to not exist, then at block 420 authentication of the received command may fail. A counter internal to memory device 110 may count the number of such received commands that are authenticated. Another counter may count the number of received commands that are not authenticated and subsequently denied access to memory device 110. Such counters, as described above, may be included in counter 130 shown in FIG. 1, for example. At block 430, the counter that counts occurrences of failed command authentication may be incremented in response to the failed authentication of the received command. At block 440, a resulting count number may be stored in memory device 110. Of course, such details of process 400 are merely examples, and claimed subject matter is not so limited.

FIG. 5 is a flow diagram of a process 500 for counting a failed count request, according to an embodiment. Such a process may be initiated by an unauthorized host processor external to a computing system that includes memory device 110, such as computing system 100 shown in FIG. 1, for example. At block 510, memory device 110 may receive a security event count request. At block 520, similar to an authentication process applied to read/write commands, for example, a security event request may be authenticated by memory device 110. However, if such a request is not authenticated, at block 530, a counter to count failed count requests may be incremented. Subsequently, at block 540, such a count may be stored in memory device 110. Of course, such details of process 500 are merely examples, and claimed subject matter is not so limited.

Figure 6:
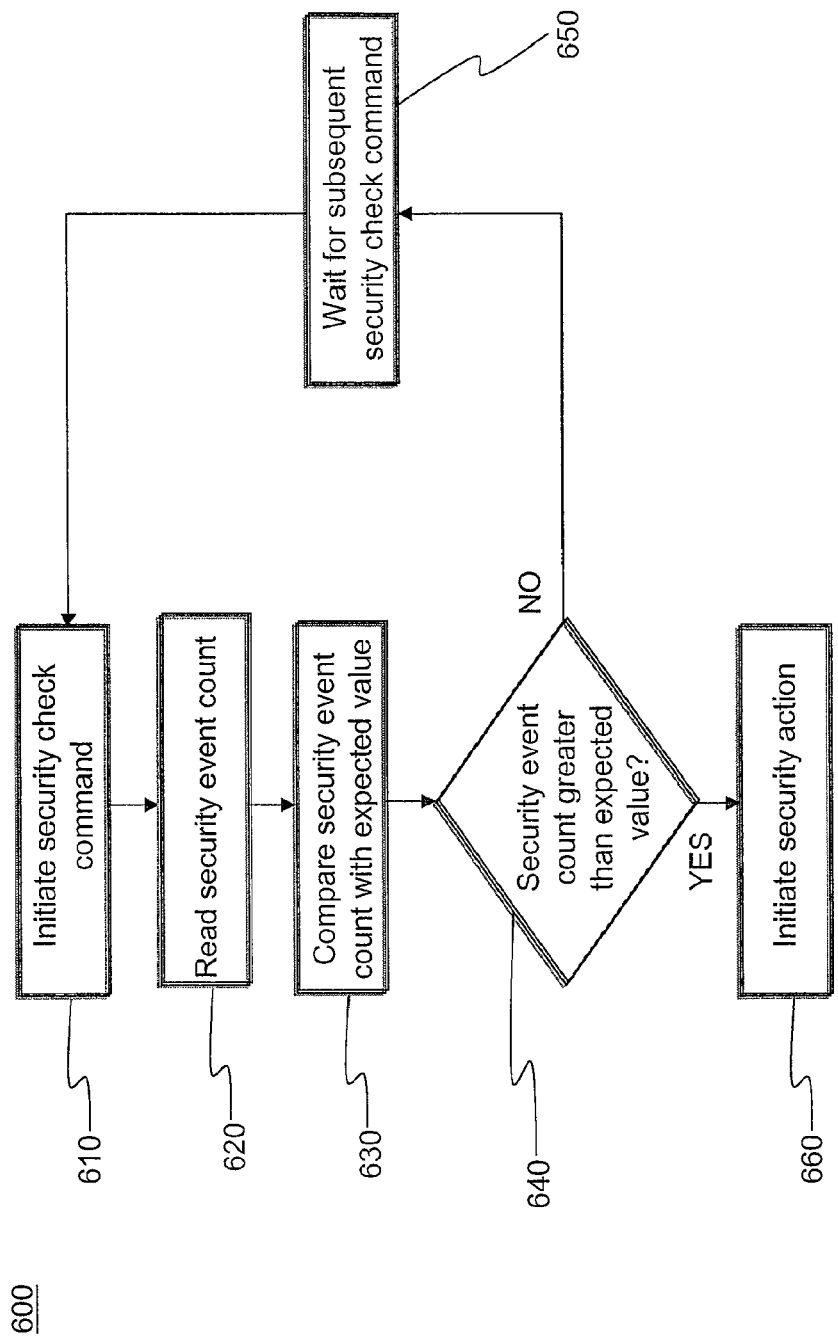
FIG. 6 is a flow diagram of a process for detecting a security attack, according to an embodiment.

FIG. 6 is a flow diagram of a process 600 for detecting a security attack, according to an embodiment. At block 610, a security check command may be initiated by one of a number of entities internal or external to a particular computer system. For example, as described above, host processor 160 may initiate a security check resulting in a read command transmitted to a memory controller to read from one or more security event counts from a memory device. Such security event counts may comprise counts of security events that are associated with the memory device. The memory device itself may maintain such security event counts. Accordingly, at block 620, host processor 160 may read one or more such security event counts from the memory device. At block 630, host processor 160 may compare one or more read security event counts with corresponding expected values of the read security event count values. At diamond 640, a determination may be made as to whether a particular security event count is greater than an expected value. If the particular security event count is not greater, process 600 may proceed to block 650 to wait for a subsequent security check command, whereupon at least a portion of process 600, as described above, may repeat. On the other hand, if a particular security event count is greater than an expected value, then at block 660 a security action may be initiated by host processor 160 because of an increased likelihood that a security attack is underway. For example, such security action may comprise one or more processes that defend a memory device from such a security attack. A security action may comprise activating an alarm that may be audible and/or visible to a user of a device incorporating the memory device. In another implementation, a security action may comprise powering down the memory device and/or other components associated with a particular computing system subjected to a possible security attack. Of course, such details of process 600 are merely examples, and claimed subject matter is not so limited.

Figure 7:
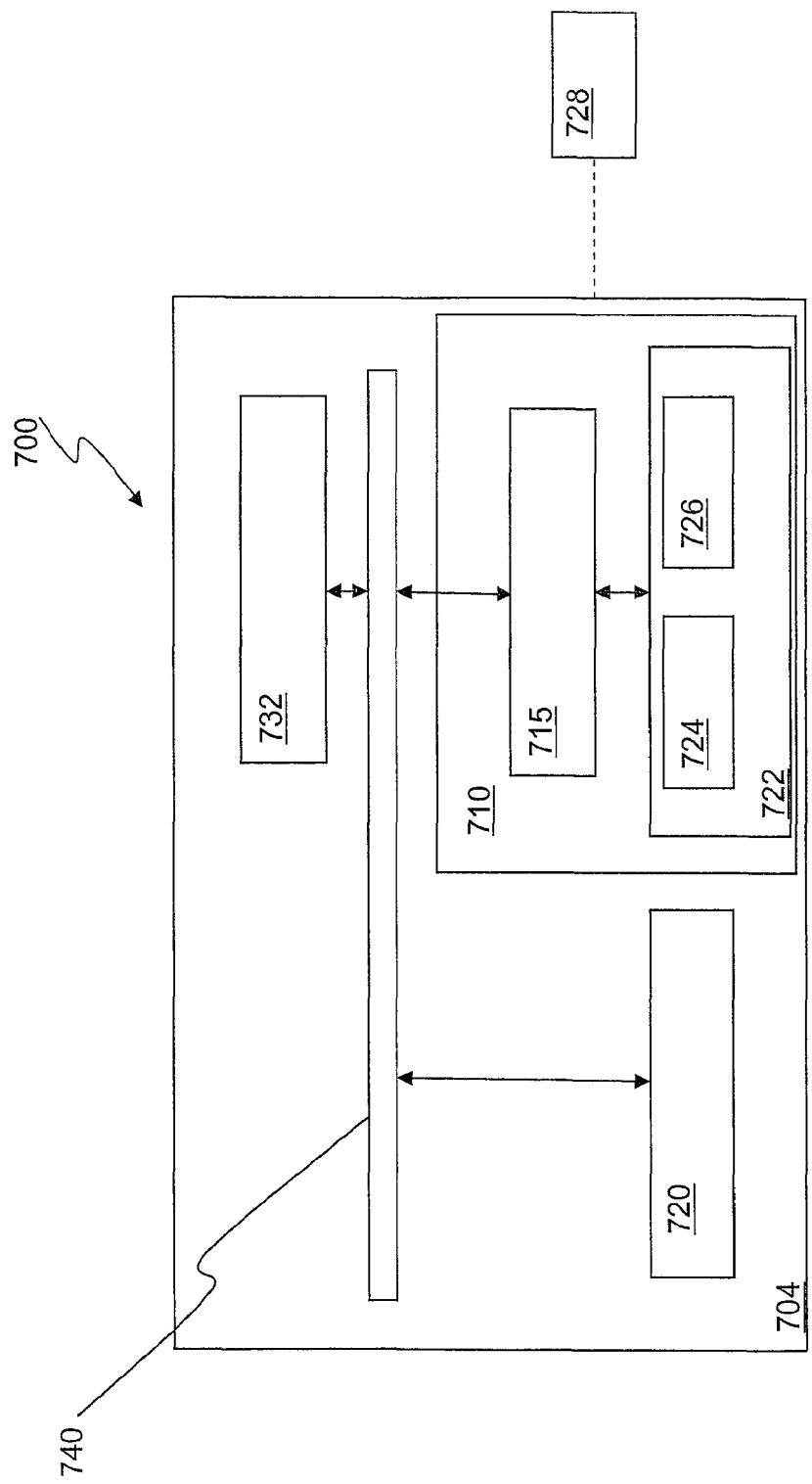
FIG. 7 is a schematic diagram of a computing system, according to an embodiment.

FIG. 7 is a schematic diagram illustrating an exemplary embodiment of a computing system 700 including a memory device 710. Such a computing device may comprise one or more processors, for example, to execute an application involving security maintenance and/or request a security event count from memory device 710. A computing device 704 may be representative of any device, appliance, or machine that may be configurable to manage memory device 710. Memory device 710 may include a memory controller 715 and a memory 722. By way of example but not limitation, computing device 704 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system; and/or any combination thereof.

It is recognized that all or part of the various devices shown in system 700, and the processes and methods as further described herein, may be implemented using or otherwise including hardware, firmware, software, or any combination thereof. Thus, by way of example but not limitation, computing device 704 may include at least one processing unit 720 that is operatively coupled to memory 722 through a bus 740 and a host or memory controller 715. Processing unit 720 is representative of one or more circuits configurable to perform at least a portion of a data computing procedure or process. By way of example but not limitation, processing unit 720 may include one or more processors, controllers, microprocessors, microcontrollers, application specific integrated circuits, digital signal processors, programmable logic devices, field programmable gate arrays, and the like, or any combination thereof. Processing unit 720 may include an operating system configured to communicate with memory controller 715. Such an operating system may, for example, generate commands to be sent to memory controller 715 over bus 740.

Memory 722 is representative of any data storage mechanism. Memory 722 may include, for example, a primary memory 724 and/or a secondary memory 726. Primary memory 724 may include, for example, a random access memory, read only memory, etc. While illustrated in this example as being separate from processing unit 720, it should be understood that all or part of primary memory 724 may be provided within or otherwise co-located/coupled with processing unit 720.

Secondary memory 726 may include, for example, the same or similar type of memory as primary memory and/or one or more data storage devices or systems, such as, for example, a disk drive, an optical disc drive, a tape drive, a solid state memory drive, etc. In certain implementations, secondary memory 726 may be operatively receptive of, or otherwise configurable to couple to, a computer-readable medium 728. Computer-readable medium 728 may include, for example, any medium that can carry and/or make accessible data, code, and/or instructions for one or more of the devices in system 700.

Computing device 704 may include, for example, an input/output 732. Input/output 732 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 732 may include an operatively configured display, speaker, keyboard, mouse, trackball, touch screen, data port, etc.

The terms, "and," "and/or," and "or" as used herein may include a variety of meanings that will depend at least in part upon the context in which it is used. Typically, "and/or" as well as "or" if used to associate a list, such as A, B or C, is intended to mean A, B, and C, here used in the inclusive sense, as well as A, B or C, here used in the exclusive sense. Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method of protecting a memory device, the method comprising:
    counting within the memory device, power cycling events of the memory device;
    maintaining a count value of the power cycling events occurring only within a particular period of time, wherein the particular period of time over which the count value is maintained is between an hour and a month;
    comparing the count value to a threshold number;
    invoking a security action including at least powering down when the count value exceeds the threshold number; and
    providing the count value to a processor external to the memory device in response to an authenticated read request.

2. The method of claim 1, wherein the threshold number is 100 power cycles and the particular period of time is one month.

3. The method of claim 1, wherein the security action further comprises sending a message to a user to indicate a potential presence of a security attack.

4. The method of claim 1, wherein the security action further comprises forbidding reading of contents stored in the memory device for a particular span of time.

5. The method of claim 1, wherein the security action comprises an alarm that is at least one of audible or visible to a user of a device incorporating the memory device.

6. A memory device comprising:
    a memory cell array; and
    a controller configured to:
        count power cycling events of the memory cell array;
        maintain a count value of the power cycling events occurring only within a particular period of time, wherein the particular period of time over which the count value is maintained is between an hour and a month;
        compare the count value to a threshold number;

invoke a security action when the count value exceeds the threshold number, wherein for the security action, the controller is further configured to power down the memory device; and provide the count value to a processor external to the memory device in response to an authenticated read request.

7. The memory device of claim 6, wherein the threshold number is 100 power cycles and the particular period of time is one month.

8. The memory device of claim 6, wherein for the security action, the controller is further configured to send a message to a user to indicate a potential presence of a security attack.

9. The memory device of claim 6, wherein for the security action, the controller is further configured to forbid reading of contents stored in the memory device for a particular span of time.

10. The memory device of claim 6, wherein the security action comprises an alarm that is at least one of audible or visible to a user of a device incorporating the memory device.

11. A system comprising:
a memory device comprising:
  a memory cell array; and
  a controller configured to:
    count power cycling events of the memory device;
    maintain a count value of the power cycling events occurring only within a particular period of time, wherein the particular period of time over which the count value is maintained is between an hour and a month;
    compare the count value to a threshold number;
    invoke a security action when the count value exceeds the threshold number, wherein for the security action, the controller is further configured to power down the memory device; and
    provide the count value to a processor external to the memory device in response to an authenticated read request; and
a system processor configured to host one or more applications and configured to initiate commands to the controller to provide access to the memory cell array.

12. The system of claim 11, wherein the threshold number is 100 power cycles and the particular period of time is one month.

13. The system of claim 11, wherein the security action comprises an alarm that is at least one of audible or visible to a user of a device incorporating the memory device.

14. The system of claim 11, wherein for the security action, the controller is further configured to forbid reading of contents stored in the memory device for a particular span of time.

15. The system of claim 11, wherein for the security action, the controller is further configured to send a message to a user to indicate a potential presence of a security attack.

* * * * *